Figure 1:
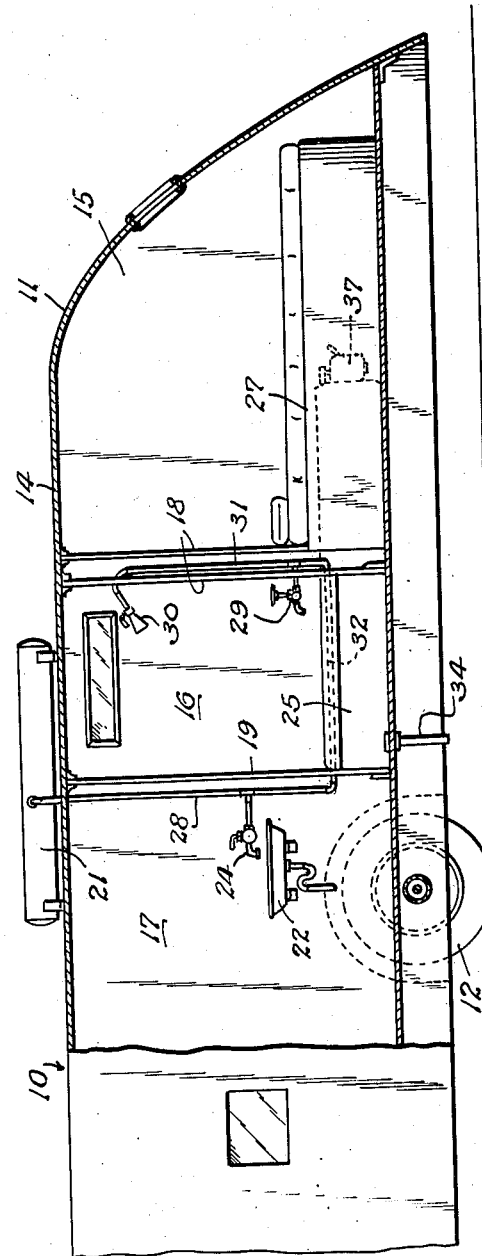

March 18, 1958  W. J. McCANLESS  2,826,785
HOME TRAILER BATHTUB
Filed April 13, 1954  2 Sheets-Sheet 1

William J. McCanless
INVENTOR

BY
ATTORNEYS.

March 18, 1958 W. J. McCANLESS 2,826,785
HOME TRAILER BATHTUB
Filed April 13, 1954 2 Sheets-Sheet 2
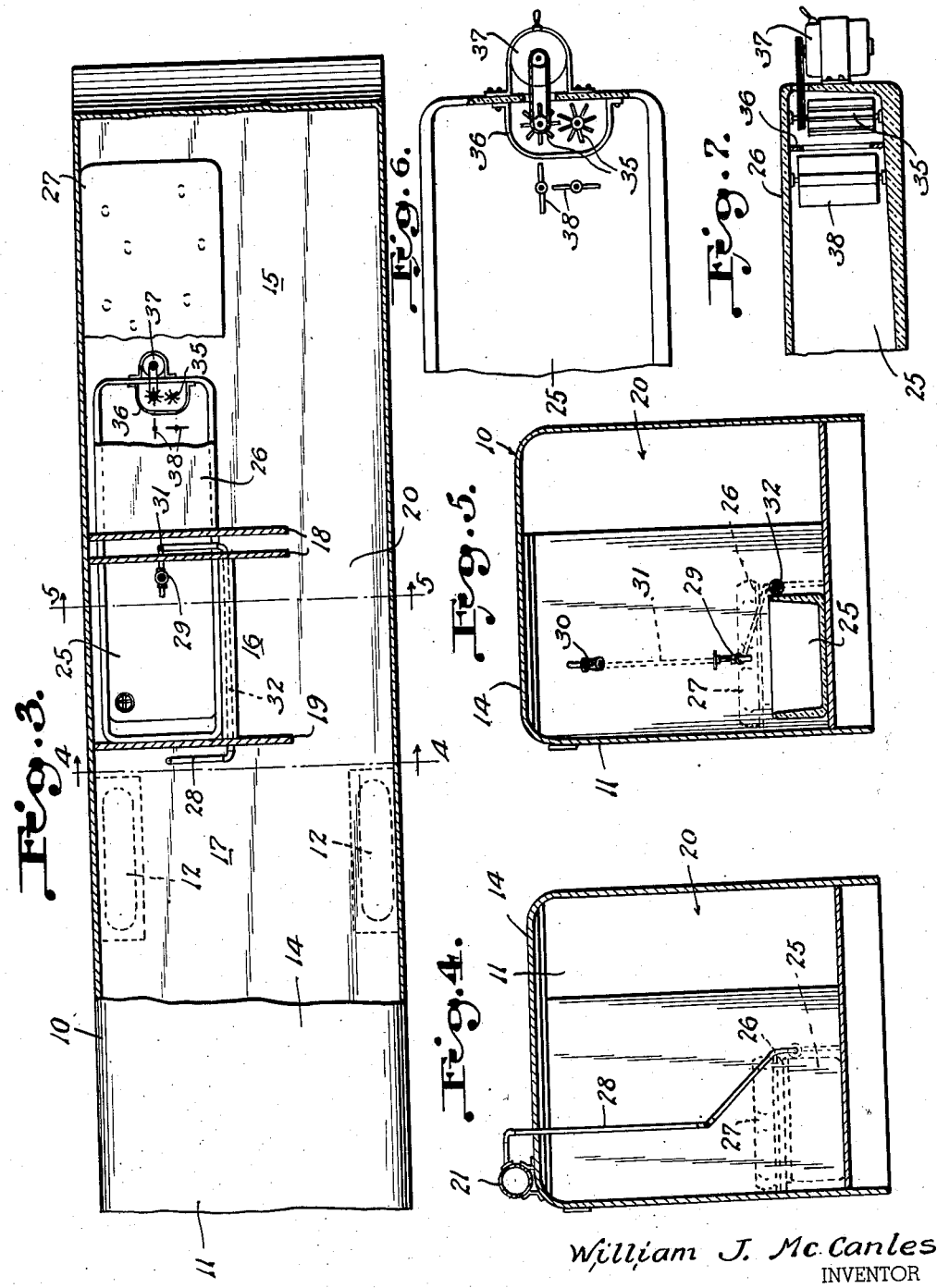
William J. Mc.Canless
INVENTOR
BY
ATTORNEYS.

United States Patent Office 2,826,785
Patented Mar. 18, 1958

2,826,785
HOME TRAILER BATHTUB
William J. McCanless, Asheville, N. C.
Application April 13, 1954, Serial No. 422,921
3 Claims. (Cl. 20—1.11)

This invention relates to a trailer hydrotherapy bath.

It is an object of this invention to provide a house trailer bathtub for a house trailer so constructed and arranged that it may readily and easily be installed in the confined space provided in a house trailer with a portion of the tub in a shower stall adjacent to a room of the trailer and a portion of the bathtub projecting from the shower stall into such room for disposition within the unused space under a bunk, bed, or the like, and completely waterproofed so that no water or vapor may be freed from the tub for splashing or running into the adjacent room.

Another object of this invention is to provide a house trailer bathtub of the kind to be more particularly described hereinafter which is small in the space required for such a bathtub and particularly suited for compact arrangement in the small rooms of a trailer to permit the free use of and complete furnishing of the trailer despite the limited accommodations of and for such trailers.

It is another object of this invention to provide a house trailer bathtub of this kind with a water tank on the top of the trailer and service pipes for the bathtub within the walls of the trailer to provide adequate water for the use of the bathtub and associated shower and holding the water and pipes out of and away from the ground to prevent any fear of water troubles which may be occasioned by freezing.

Other and further objects and advantages of the invention will be hereinafter described and the novel features thereof defined in the appended claims.

Figure 2:
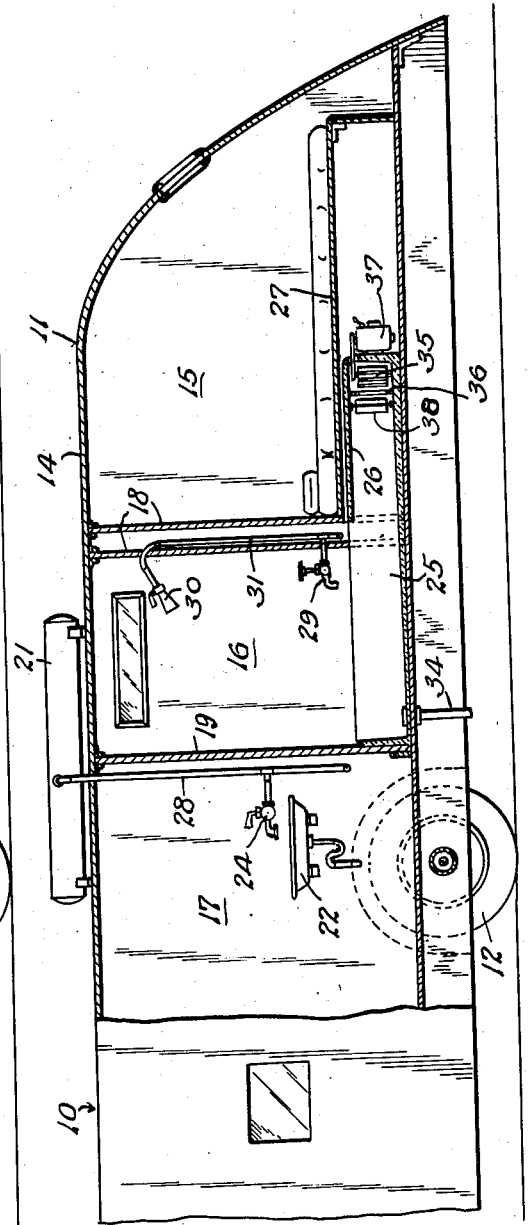

In the drawings:

Fig. 1 is a side elevation in section of a house trailer, partly broken away showing a bathtub arranged according to my invention, Fig. 2 is a side elevation in section through the bathtub, partly broken away, of the house trailer, Fig. 3 is a top plan view, partly broken away, in section, of the trailer and bathtub arranged according to my invention, Fig. 4 is a transverse cross section taken on the line 4—4 of Fig. 3, Fig. 5 is a transverse section taken on the line 5—5 of Fig. 3, Fig. 6 is an enlarged plan view of the agitator pump and vane of the bathtub, and Fig. 7 is an enlarged side elevation in section of the bathtub showing the pump and vanes of Fig. 6.

Referring now more particularly to the drawings the numeral 10 designates generally a wheeled trailer constructed and arranged according to an embodiment of my invention. The wheeled trailer 10 is provided with a body 11 supported on wheels 12 which are arranged relative to the body in a somewhat conventional manner. A cover 14 is carried by the trailer body 11 and extends thereover and onto the opposite sides and ends thereof in the conventional manner.

The trailer body 11 is so arranged interiorly thereof to provide a room 15 adjacent the rear end thereof, with a shower stall 16 between the room and a kitchen 17.

Double walls 18 are formed in the trailer as a partition between the shower stall 16 and the room 15 for the purposes to be more particularly described hereinafter.

A single wall 19 is placed to provide a suitable partition between the kitchen 17 and the shower stall 16.

A passageway 20 or hall extends longitudinally on one side of the trailer body 11 and connects the kitchen, shower stall and room 15.

A suitable water tank 21 is positioned on top of the trailer body 11 to provide for an adequate source of water within the trailer. A heating element, not shown in the drawings, may be provided for the water tank 21 when it is desired to have warm or heated water within the trailer.

A conventional sink 22 is located within the kitchen, the sink having a spigot 24 thereabove.

The shower stall is provided with the bathtub 25 arranged between the shower stall 16 and adjacent room 15. A portion of the bathtub 25 is located within the shower stall and the other portion of the bathtub extends through the lower end of the double walls 18 into the adjacent room. A bathtub cover 26 is fitted on the portion of the bathtub which projects into the adjacent room, so that this portion of the bathtub is suitably and adequately sealed, in order that water in the bathtub will not be splashed or spilled outwardly into the room. A bunk 27 is adapted to be seated on top of the bathtub cover 26 within the adjacent room so that the projecting portion of the bathtub is used as a suitable base for the bunk.

A pipe 28 extends downwardly from the tank 21 to provide water for the sink and bathtub. A bathtub spigot 29 is supported on wall 18 in the shower stall just above the tub. A sprinkler head 30 is also provided in the stall overhead on pipe 31. Water to the sprinkler and tub flows from pipe 28 through connecting pipe 32 alongside the tub, as seen in Fig. 1. The outlet drain pipe 34 is shown conveniently located rearwardly of wheel 12.

A circulating gear pump 35 is pivotally mounted in the bathtub adjacent the inner enclosed end and between the tub bottom and water tight sealed cover 26. It is enclosed with a protective screen 36 attached to the tub end and driven by an electric motor mounted outside of the tub end, beneath bunk 27. Vanes 38 are pivotally mounted between the bathtub bottom and the top cover 26 adjacent the pump screen 36. These are adjusted to direct the flow of water from pump 35 as desired.

Use and operation

The tub and shower are used in the usual way. The sink spigot 24 should be closed to keep pressure on the sprinkler 30, when in use.

To use the tub for a hydrotherapy effect, the vanes 38 are turned as desired and the motor 37 started after the water is drawn. The sealed cover 26 excludes the outside circulating air as the pump 35 agitates and circulates the bath water about the person. The bather reclines and relaxes with head uncovered for breathing the air just above, as he receives the treatment.

The shower stall partition wall 18 and bath tub sealed cover 26, constructed and arranged as shown, cooperate with the pump 35, as noted just above. Also, this construction mutually results in several other combined functions, as an exemplification of my invention. The wall 18 and tub cover seal 26 exclude water, vapor, and noise from the bath tub and shower to compartment 15. This construction also conserves much needed space. The tub and cover 26 serve as a support or table top for the bunk 27 or other objects.

One embodiment of the invention has been disclosed herein. However, various modifications of this construction may be made within the scope of the appended claims.

I claim:

1. In a house trailer, a space conserving body including a room, a wall dividing said room area into adjacent rooms, one of said rooms constituting a bathroom, said wall having an opening adjacent to the floor thereof establishing communication between said rooms, the room adjacent to said bathroom having a stationary bunk therein spaced from the floor of said room providing a space communicating with said bathroom through said opening, a bathtub arranged within said bathroom, said bathtub extending through said opening in said wall a substantial distance, the end of said bathtub extended into said adjacent room being concealed under said bunk.

2. The subject matter as set forth in claim 1; and a permanent cover forming an integral part of said tub covering only the end of said tub extending into the room adjacent to the bathroom, said covering being spaced from the bunk.

3. In a trailer having spaced side walls, a top wall and a bottom wall, a bathtub disposed adjacent one side wall, a pair of shower stall walls extending inwardly from said one side wall, one of said pair of walls being disposed at one end of said tub and the other one of said pair of walls extending over the top of said tub between the ends thereof, an inner wall extending from said one side wall and disposed closely adjacent said other wall, a water pipe disposed between said inner and said outer walls, a spigot interposed in said pipe adjacent the top of said tub, a shower spray head secured to the upper end of said pipe and projecting over said tub, a supply tank connected to said pipe, a U-shaped pump housing at the other end of said tub, pump gears in said housing, means for rotating said gears, said housing having a discharge opening communicating with the interior of the tub, and a pair of vanes adjustably carried by said tub confronting said discharge opening for regulating the circulation of water within the tub.

References Cited in the file of this patent

UNITED STATES PATENTS

| | | |
|---|---|---|
| 583,066 | Mengis | May 25, 1897 |
| 771,153 | James | Sept. 27, 1904 |
| 1,580,661 | Funk et al. | Apr. 13, 1926 |
| 1,582,881 | Kraemer | Apr. 27, 1926 |
| 2,515,667 | Schauffler | July 18, 1950 |
| 2,562,050 | Lankton | July 24, 1951 |
| 2,569,641 | Metherell | Oct. 2, 1951 |
| 2,577,836 | Willson | Dec. 11, 1951 |
| 2,730,104 | Newman | Jan. 10, 1956 |

FOREIGN PATENTS

| | | |
|---|---|---|
| 87,597 | Germany | July 18, 1896 |